(12) United States Patent
Bristow (10) Patent No.: US 11,102,096 B2
(45) Date of Patent: *Aug. 24, 2021

(54) TRACEROUTES FOR DISCOVERING THE NETWORK PATH OF INBOUND PACKETS TRANSMITTED FROM A SPECIFIED NETWORK NODE

(71) Applicant: Akamai Technologies, Inc., Cambridge, MA (US)

(72) Inventor: Peter Bristow, Maidenhead (GB)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,889

(22) Filed: Apr. 24, 2020

(65) Prior Publication Data

US 2020/0389379 A1   Dec. 10, 2020

Related U.S. Application Data

(63) Continuation of application No. 16/292,616, filed on Mar. 5, 2019, now Pat. No. 10,673,718, which is a
(Continued)

(51) Int. Cl.
*H04L 12/28* (2006.01)
*H04L 12/26* (2006.01)
(Continued)

(52) U.S. Cl.
CPC ........ *H04L 43/062* (2013.01); *H04L 12/4633* (2013.01); *H04L 41/12* (2013.01);
(Continued)

(58) Field of Classification Search
None
See application file for complete search history.

(56) References Cited

U.S. PATENT DOCUMENTS 7,650,427 B1   1/2010   Liu et al.
7,698,458 B1   4/2010   Liu et al.
(Continued)

OTHER PUBLICATIONS

U.S. Appl. No. 15/599,568, filed May 19 2017.
(Continued)

*Primary Examiner* — Gerald A Smarth (57) ABSTRACT

Disclosed herein are systems, methods, and apparatus for performing a new kind of traceroute. This traceroute is referred to herein as a "reverse" traceroute, as it enables a given network node to determine the path of packets sent to it from another node. Preferably, an encapsulating tunnel between the two nodes is leveraged. Preferably, a given network node ("first node") performs the reverse traceroute by sending encapsulated inner packets in the tunnel to another network node ("second node"). The second node reflects the inner packets back to the first node. Preferably, the inner packets are configured such that their IP header TTLs expire at intermediate nodes (such as routers), and such that the resulting error messages are reported to the first node. In this way, the first node obtains information about the topology of the network and the path taken by inbound packets.

10 Claims, 9 Drawing Sheets

| Delivery Header | GRE header | Payload (Inner Packet) | | |
|---|---|---|---|---|
| IP Header with:<br>SRC = A<br>DEST = B<br>TTL=64 | GRE Fields<br>(Protocol Type= IP) | Delivery Header | GRE Header | Payload |
| | | IP Header w/<br>SRC = A<br>DEST = A<br>TTL=1 | GRE Fields<br>(Protocol Type= 0) | |

SRC = source address
DEST = destination address

| Delivery Header | GRE header | Payload (Inner Packet) | | |
|---|---|---|---|---|
| IP Header with:<br>SRC = A<br>DEST = B<br>TTL=64 | GRE Fields<br>(Protocol Type= IP) | Delivery Header | GRE Header | Payload |
| | | IP Header w/<br>SRC = A,<br>DEST = A,<br>TTL=2 | GRE Fields<br>(Protocol Type= 0) | |

SRC = source address
DEST = destination address

Related U.S. Application Data continuation of application No. 15/599,568, filed on May 19, 2017, now Pat. No. 10,270,674.

(51) Int. Cl.
*H04L 12/46* (2006.01)
*H04L 12/733* (2013.01)
*H04L 12/24* (2006.01)

(52) U.S. Cl.
CPC .............. *H04L 43/06* (2013.01); *H04L 43/10* (2013.01); *H04L 45/20* (2013.01); *H04L 2212/00* (2013.01)

(56) References Cited

U.S. PATENT DOCUMENTS

| | | | |
|---|---|---|---|
| 9,385,925 B1 * | 7/2016 | Scholl | ...................... H04L 12/18 |
| 10,270,674 B2 | 4/2019 | Bristow | |
| 2005/0207410 A1 * | 9/2005 | Adhikari | .................. H04L 69/22 370/389 |
| 2009/0141722 A1 * | 6/2009 | Hall, Jr. | .................. H04L 45/02 370/392 |
| 2010/0103822 A1 * | 4/2010 | Montwill | ............ H04L 41/0677 370/242 |
| 2013/0322436 A1 * | 12/2013 | Wijnands | ................ H04L 45/20 370/389 |
| 2015/0124629 A1 * | 5/2015 | Pani | ....................... H04L 45/563 370/248 |
| 2017/0187603 A1 * | 6/2017 | Kumar | .................... H04L 43/12 |
| 2018/0337839 A1 | 11/2018 | Bristow | |
| 2019/0268247 A1 | 8/2019 | Bristow | |

OTHER PUBLICATIONS

Transmittal Letter titled "Communication Under MPEP § 609.02", submitted with this IDS, Apr. 22 2020, 2 pages.
U.S. Appl. No. 16/292,616, filed May 3, 2019.

\* cited by examiner

| Delivery Header | GRE header | Payload |
|---|---|---|
|  |  |  |

FIG. 1

| Delivery Header | GRE header | Payload (Inner Packet) | | |
|---|---|---|---|---|
| IP Header for outer packet | GRE Fields (Protocol Type= IP) | IP Header | TCP Header | HTTP Request |

FIG. 2

| Delivery Header | GRE header | Payload (Inner Packet) | | |
|---|---|---|---|---|
| IP Header with:<br>SRC = A,<br>DEST = B | GRE Fields<br>(Protocol<br>Type= IP) | Delivery Header | GRE Header | Payload |
| | | IP Header:<br>SRC = B,<br>DEST = A | GRE Fields<br>(Protocol<br>Type= 0) | |

SRC = source address

DEST = destination address

*FIG. 3*

| Delivery Header | GRE header | Payload (Inner Packet) | | |
|---|---|---|---|---|
| IP Header with:<br>SRC = A<br>DEST = B<br>TTL=64 | GRE Fields<br>(Protocol<br>Type= IP) | Delivery Header | GRE Header | Payload |
| | | IP Header w/<br>SRC = A<br>DEST = A<br>TTL=1 | GRE Fields<br>(Protocol<br>Type= 0) | |

SRC = source address

DEST = destination address

*FIG. 4A*

| Delivery Header | GRE header | Payload (Inner Packet) | | |
|---|---|---|---|---|
| IP Header with:<br>SRC = A<br>DEST = B<br>TTL=64 | GRE Fields<br>(Protocol<br>Type= IP) | Delivery Header | GRE Header | Payload |
| | | IP Header w/<br>SRC = A,<br>DEST = A,<br>TTL=2 | GRE Fields<br>(Protocol<br>Type= 0) | |

SRC = source address

DEST = destination address

*FIG. 4B*

| Delivery Header | GRE header | Payload (Inner Packet) | | |
|---|---|---|---|---|
| IP Header with:<br>SRC = A<br>DEST = B<br>TTL= X | GRE Fields<br>(Protocol<br>Type= IP) | Delivery Header | GRE Header | Payload |
| | | IP Header w/<br>SRC = A,<br>DEST = A,<br>TTL=1,2…N | GRE Fields<br>(Protocol<br>Type= 0) | |

SRC = source address

DEST = destination address

TRACEROUTES FOR DISCOVERING THE NETWORK PATH OF INBOUND PACKETS TRANSMITTED FROM A SPECIFIED NETWORK NODE

BACKGROUND

Technical Field

This patent document relates generally to computer networking and to techniques for discovering the topology of computer networks.

BRIEF DESCRIPTION OF BACKGROUND ART

Traceroute is a well-known technique for discovering network topology between a sender and receiver. In brief, a traceroute involves a network node (referred to here as node A) transmitting a set of packets to another network node (referred to here as node B). The set of packets are configured such that the TTL value in the IP packet header is incrementally increased (or varied) across successive packets. For example, the first packet has TTL=N, the next packet has TTL=N+1, the next packet has TTL=N+2, and so on. The TTL is essentially a permissible hop count for the packet. Routers along the network path will examine the TTL field of packets they receive before forwarding them. Routers decrement the TTL of a given packet by one before forwarding it. If a router finds that the TTL will become zero, then the packet has expired. In this circumstance, the router transmits an error message back to the sender (node A). More specifically, the error message is the ICMP Time Exceeded error message. The error message contains information about the router transmitting it, so node A is able to identify the router as a device on a path between the A and B. By sending packets with incrementally increasing TTL values such that one will expire after each hop, node A is able to discover the identity of each router on the network path from A to B.

This approach works well and has been widely used for many years. The information obtained from traceroutes is useful in understanding network topology, improving routing, identifying faults and performance issues, and the like. However, the conventional traceroute approach provide information only on a forward (outbound) network path for packets going from node A to B. The path taken by inbound packets sent from B to A is not known to A. Those paths may differ, i.e., network paths are not always symmetrical. Indeed path asymmetry may exist even if the packets are part of the same message exchange (e.g., HTTP request and response), or the same transport layer connection (e.g., TCP connection). Of course, for node A to obtain information about the inbound network path from B to A, node B could perform a traceroute and send the results to A. But, in many circumstances this is impractical or inefficient, as it requires coordination between the entities operating A and B. A goal of the techniques herein is to enable node A to obtain inbound network path information about packets sent to A from B, preferably without node B performing a traceroute, and preferably without node B performing any testing reporting back to A.

This document discloses ways for a node to discover network topology in the inbound direction from designated source node. In the context of the terminology provided above, a given node A can discover the network path taken by inbound packets sent from node B to A. In this document, this is referred to as a "reverse" traceroute for convenience.

Combined with the conventional forward traceroute techniques described above, a reverse traceroute enables node A to perform bidirectional path reporting and to have a more complete picture of the transit paths between node A and B. Other benefits and applications of the teachings hereof will become apparent to those skilled in the art upon review of this document.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods, systems, and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety and for all purposes. The term "e.g." used throughout is used as an abbreviation for the non-limiting phrase "for example."

In one embodiment, a reverse traceroute leverages a generic routing encapsulation (GRE) tunnel between the two network nodes A and B. GRE is a well-known tunneling protocol; it is described in IETF RFCs 1701, 2784, 2890. In general, it enables a first packet using a particular protocol to be encapsulated in a second packet. The encapsulation may be done using either the same or a different network protocol. IP packet in IP packet encapsulation is a typical example. Tunneling protocols other than GRE that are consistent with the teachings hereof may be used as well.

Figure 1:
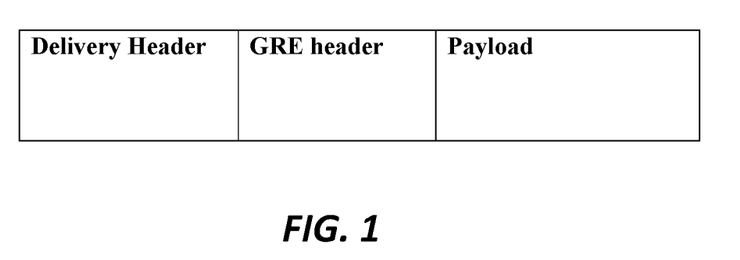
FIG. 1 shows an example of the basic form of GRE packet.

FIG. 1 illustrates the basic form of GRE packet encapsulation. The Delivery Header uses the delivery protocol of the GRE packet, for example IP. The Delivery Header contains the source and destination IP addresses of the tunnel endpoints, A and B. The GRE header contains several fields which are defined in RFC 1701, including the protocol type field (PT field). This field contains a value which specifies the protocol type of the payload packet. Assuming IP in IP tunneling, the value would be set to indicate IP (0x800). The payload is the encapsulated packet, which again assuming IP in IP tunneling, would be another IP packet.

Figure 2:
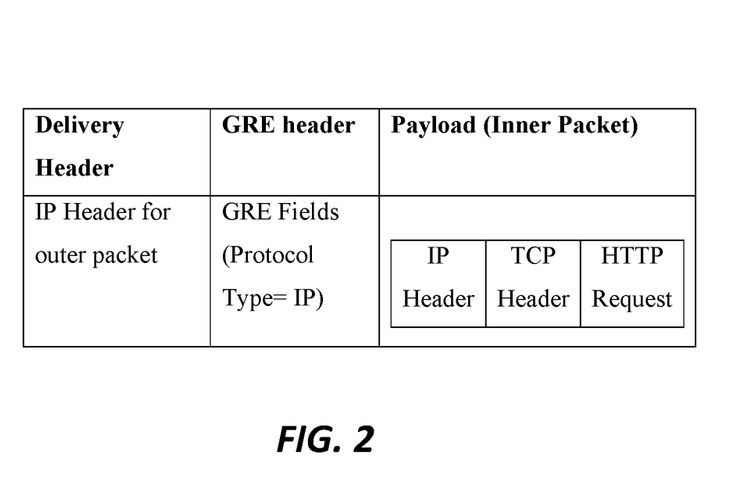
FIG. 2 shows an example of a GRE packet using IP as the delivery protocol and encapsulating an inner IP packet.

At a high level, encapsulation of an HTTP request using a GRE tunnel with IP in IP tunneling would be as shown in FIG. 2.

GRE has a keepalive mechanism to keep the tunnel up and operating. This keepalive mechanism is known in the field and widely supported. The keepalive mechanism involves sending a "keepalive", which has the basic form (assume IP in IP tunnel) shown in FIG. 3.

Figure 3:
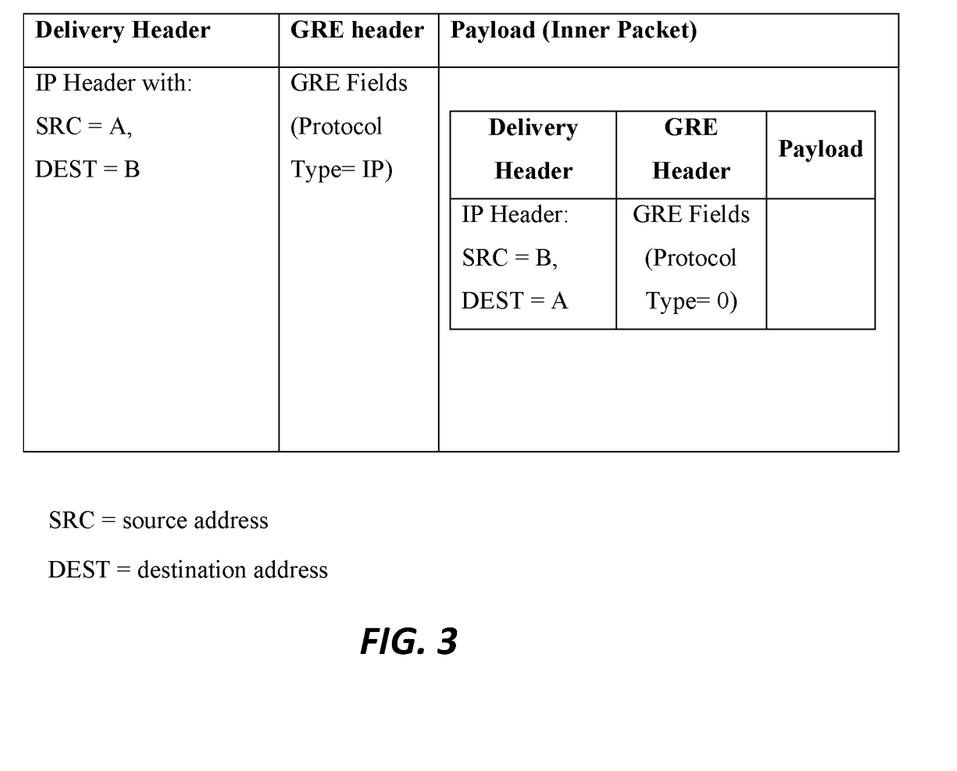
FIG. 3 shows an example of a GRE keepalive.

In short, the keepalive shown in FIG. 3 is a GRE packet encapsulated within another GRE packet. The inner GRE packet is sometimes referred to herein as the "keepalive inner packet", "keepalive response" or "encapsulated keepalive response", all meaning the same thing. The outer GRE packet is sometimes referred to herein as the "keepalive outer packet" or the "encapsulating packet", all meaning the same thing.

When the destination receives the keepalive, it will decapsulate by removing the outer GRE packet. It will then send the inner GRE packet back out over the network interface to the source of the keepalive packet, because of the destination IP address of the inner packet. The inner GRE packet is the keepalive response to the source. In other words, the inner GRE packet is "reflected" back to the sender.

The use of this GRE keepalive for performing reverse traceroutes is now described.

Assume that a GRE IP in IP tunnel has been set up between two nodes A and B. This can be done in a conventional fashion, as those skilled in the art will understand.

For A to conduct a reverse traceroute and discover the path from B to A, in one embodiment, A constructs a special set of GRE keepalives and transmits them towards B. The outer GRE packet TTL values for each keepalive packet in the set can be the same. For example, TTL=64, or 128, which are typical values, or other number sufficient to reach the endpoint.

The TTL of the inner GRE packet is incremented with reach GRE packet. In other words, for the first keepalive packet, the inner TTL=1. For the next keepalive, the inner TTL=2, etc. In addition, the source IP address of the inner GRE packet is set to the IP address of A, i.e., the node conducting the reverse traceroute. In a preferred embodiment, one can continue to send keepalive packets, incrementing the inner TTL with each packet, until an inner keepalive packet is received back at A, rather than an ICMP error message. In another embodiment, a forward traceroute can be performed to determine the number of hops between A and B, and this value can be used as an approximation of the number of hops in the B to A direction. Then, one can send a set of keepalives with the inner TTL values incrementing with each packet from a minimum of 0 to a maximum value set to be about equal to the hop count.

Figure 4A:
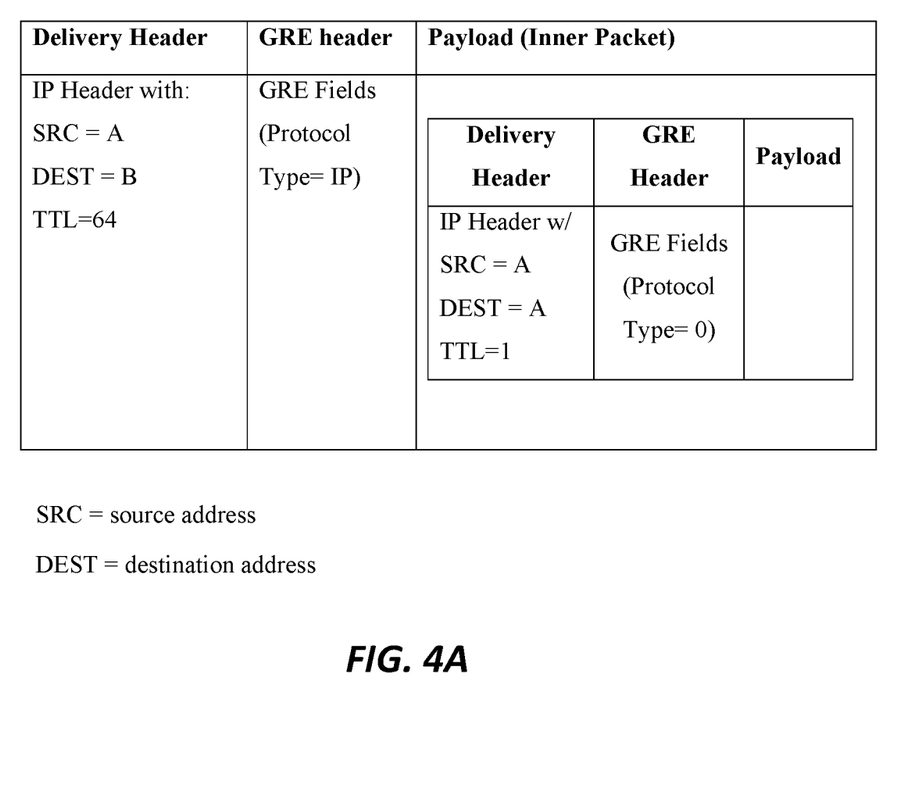
FIGS. 4A-4C show examples of a GRE keepalive configured for a reverse traceroute.
Figure 4B:
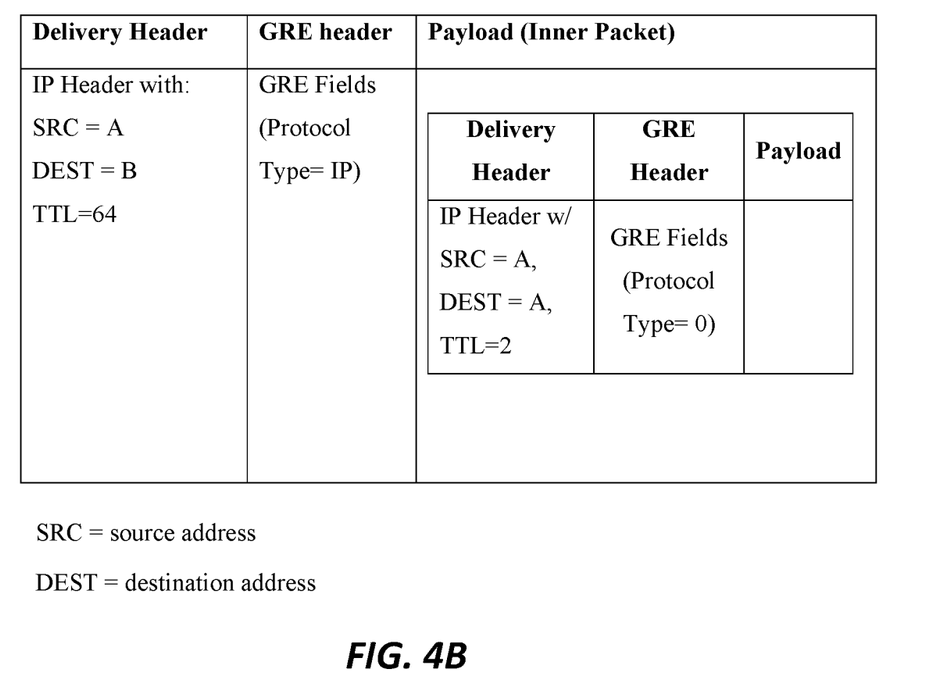
Figure 4C:
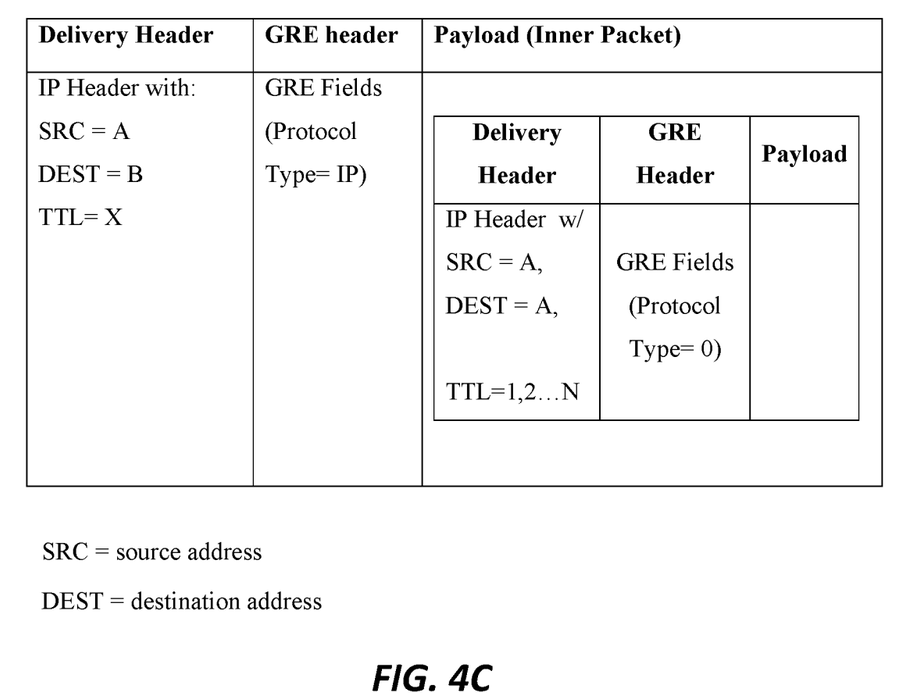

FIGS. 4A-4C illustrate GRE keepalives for IP in IP tunneling and configured for a reverse traceroute in the manner just described. In FIG. 4A, the outer GRE packet has TTL=64, the inner GRE packet has TTL=1, and the destination address of the inner GRE packet is node A. In FIG. 4B, the outer GRE packet has TTL=64, the GRE inner packet has TTL=2, and the destination address of the inner GRE packet is node A. In practice, a series of such keepalives would be sent as part of the reverse traceroute, although just one of such keepalives could be used to discover one intermediate node.

In FIG. 4C, a general form of a set of one or more GRE keepalives is shown. The outer GRE packet has TTL=X, where X is some fixed value across the packets (although in some embodiments X could vary). The inner GRE packet has the source the destination addresses both pointing to the address of node A, the sender of the keepalive. The TTL=1, 2 . . . N indicates there is a set of N keepalives with incrementing TTLs across the set.

The effect of these specially constructed keepalives in the network is now described. Node A transmits the keepalives to node B in the GRE tunnel. Upon receipt of a given keepalive, node B simply treats it in the usual way that keepalives are treated. This means that node B decapsulates by removing the payload (i.e., the inner GRE packet) from the outer GRE packet, and "reflecting" the inner GRE packet back to node A.

Continuing with the example, the inner GRE packet begins to travel back across the network(s) from B to A, with the inner TTL value being decremented along the way by routers. If the inner GRE packet TTL value is below the actual number of hops between A and B, it will not reach node A, but rather expire along the way. Assume for example that the inner GRE packet TTL=1. After the inner GRE packet (or more precisely, the formerly-inner packet, which is the keepalive response) is reflected from B back to A, the first router on the network path from B to A will receive this inner GRE packet. The router will decrement the TTL value and find that it is expired (TTL=0). The router will then send an ICMP Time Exceeded error message to the source address—which points to A. In this way, node A will receive the error message and discover the first hop for packets sent from B to A. Likewise, an inner GRE packet of TTL=2 will provide A with the identity of the router after the second hop from B to A. In sum, the incrementing inner TTL values in the set of keepalives means that each inner packet will expire one hop further along the path from B to A, causing each of the intermediate routers to inform A about each hop.

In the foregoing, routers have been used as examples of the intermediate devices, but any middlebox that complies with the checking and decrementing of TTL-based expiry of routed packets can be identified in this manner.

As with prior art traceroutes, some middleboxes may treat traceroute packets differently than other packets. Hence, in some embodiments, the payload of the inner GRE packet can be populated with data so that the inner GRE packet simulates an actual layer 7 packet. In this way it may more accurately follow the network path that larger packets may take. Moreover, the inner GRE packet may have layer 4 (TCP, UDP) or layer 7 protocol headers designed to mirror the actual traffic that will flow, or is flowing, between nodes A and B. This means that the traceroute packets can be crafted so as to recreate any policy based routing decisions and/or QoS decisions that the middleboxes may enforce based on these headers, or the protocols, or on packet size.

An example of code for generating the appropriate keepalives for a reverse traceroute appears in the section below.

```
########################################
#forward traceroute
send(IP(src+32"192.0.2.0", dst="198.51.100.0", id=id, ttl=(1..250)) / GRE(proto = 0x0800,
key=SiteID) / IP(dst="192.0.2.0", src="198.51.100.0", id=id) / GRE(proto=0))
#reverse traceoute
send(IP(src="192.0.2.0", dst="198.51.100.0") / GRE(proto = 0x0800) / IP(dst="192.0.2.0",
src="192.0.2.0", id=id, ttl=(1..250)) / GRE(proto=0, key=SiteID))
#results
[root@test0 /]# tcpdump -ni log0
fwd-trc>18:31:32.896464 IP 192.0.2.2 > 192.0.2.0: ICMP time exceeded in-transit, length
56
rvs-trc>18:31:32.929182 IP 192.0.2.4 > 192.0.2.0: ICMP time exceeded in-transit, length 32
fwd-trc>18:31:32.958940 IP 192.0.2.6 > 192.0.2.0: ICMP time exceeded in-transit, length
56
rvs-trc>18:31:32.987900 IP 192.0.2.8 > 192.0.2.0: ICMP time exceeded in-transit, length 32
fwd-trc>18:31:33.022908 IP 198.51.100.0 > 192.0.2.0: GREv0, length 4: gre-proto-0x0
rvs-trc>18:31:33.087878 IP 198.51.100.0 > 192.0.2.0: GREv0, length 4: gre-proto-0x0
########################################
```

The code uses the Scapy packet generation library, which is a well-known Python framework for creating and sending packets. The first 'send' command implements a conventional forward traceroute from node 192.0.2.0 to node 198.51.100.0. (The actual IP addresses in this example have been obfuscated by changing them to IP addresses within blocks reserved for documentation, as specified in IETF RFC 5737.) The code specifies a set of GRE keepalives with outer packet TTLs incrementing from 1 to 250 (i.e., first packet has outer TTL=1, second packet has outer TTL=2, and so on). Of course, less than 250 hops may be needed to reach node 198.51.100.0; those that do not expire before reaching the end will be reflected back. By identifying the highest outer TTL to result in an ICMP error message (rather than being reflected), the sending node 192.0.2.0 can determine the number of hops to the endpoint 198.51.100.0. The inner "id" field specifies that the GRE protocol is IP (0x0800). There is also a key of SiteID, which is an identifier for the tunnel.

The second 'send' command is the reverse traceroute. It specifies a set of GRE keepalives with inner packet TTLs incrementing from 1 to 250 (i.e., first packet has inner TTL=1, second packet has inner TTL=2, and so on). Also, the source address of the inner packet is set to IP address 192.0.2.0, which is the node performing the reverse traceroute. Also, the code specifies that the GRE protocol is IP (0x0800), and provides a key of SiteID as an identifier for the tunnel.

The traceroute report resulting from executing the two 'send' commands are shown under #results. The log lines have been annotated with fwd-trc> and rvs-trc> for "forward traceroute" and "reverse traceroute", respectively, to identify the traceroute test/set of keepalives that produced them. One observes that the two traced paths are not symmetrical, i.e., the IP addresses of the routers on the 192.0.2.0 to 198.51.100.0 link differs from those on the 198.51.100.0 to 192.0.2.0 link.

Reverse Traceroutes With Out-of-Band Reporting and Monitoring

In an alternate embodiment, the reverse traceroute can be configured with a source IP address that points to a host other than A. By setting the inner packet IP source address to the address of node C, for example, the results of the reverse traceroute will be reported to node C. This enables node C to monitor and diagnose problems in the network path from B to A. Put another way, the inner packet IP source address defines the node that should receive the results of the traceroute test. Preferably, the SiteID label that was mentioned above can be used to help node C identify the tunnel to which the traceroute results apply. This means that the SiteID label can be set by A to be a unique identifier for the tunnel, such that the ICMP error messages carry this label to node C and thereby inform it of the relevant tunnel. The addresses of B and C can be rotated across a set of locations/hosts to give additional visibility.

Further, in yet another embodiment, the inner IP source address can be configured to point to multiple hosts and/or be used in multiple locations. For example, the address can be an Anycasted IP address or virtual IP address. In this case, too, the SiteID label can be used to help node C identify the tunnel to which the traceroute results apply.

Use of Other Tunneling Protocols

The teachings of this document can be extended to other tunneling protocols. For an IPv* version transport (v* being version 4, 6, or other), there should be an IPv* packet at some encapsulation level. For example, vxlan packet structure is IPv4( )/UDPO/Ethernet( )/IPv4( ). Hence, one can achieve the same keepalive mechanism by putting a UDP packet in the inner IPv4( ) packet. The UDP packet would be configured as specified herein, with inner TTL and inner source address arranged to produce the reverse traceroute.

As those skilled in the art will recognize, the foregoing description merely refers to examples of the invention. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways. Nodes A and B in the above example can represent any, server, client device, datacenter, or other computer.

Use With Content Delivery Networks, Cloud Infrastructure

The teachings hereof can be employed by content delivery networks. For example, a content delivery network service provider may maintain GRE tunnels from its delivery infrastructure to a customer's origin infrastructure. Using the techniques disclosed herein, i.e. by running reverse traceroutes from a CDN server, the CDNSP can probe the inbound path from a customer's origin to its CDN servers.

An infrastructure as a server provider (IaaS) may provide an attack mitigation service, such as a described in U.S. Pat. No. 7,478,429, the contents of which are hereby incorporated by reference. The IaaS provider can use the techniques disclosed herein, i.e., running at a data cleaning center and from a machine in that center performing a reverse traceroute to discover the inbound path from a customer's origin to the data cleaning center. The IaaS provider may or may not be a CDN.

For completeness, the general architecture of a CDN is now described. A CDN is a distributed computing platform. They are often operated and managed by a service provider. A "distributed system" of this type typically refers to a collection of autonomous computers linked by a network or networks, together with the software, systems, protocols and techniques designed to facilitate various services, such as content delivery or the support of outsourced site infrastructure, and/or security. The infrastructure is shared by multiple tenants, typically content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent nodes that are located in mobile networks, in or adjacent enterprise-based private networks, or in any combination thereof.

Figure 5:
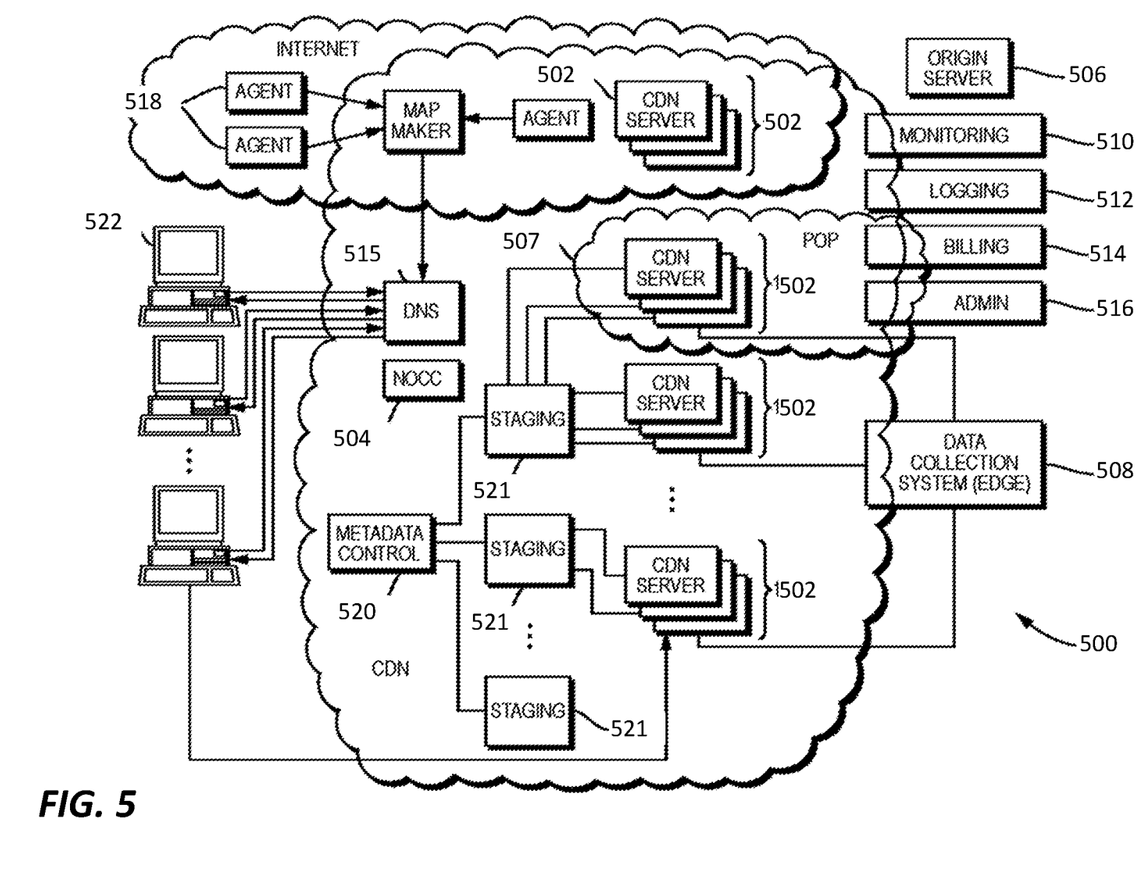
FIG. 5 is a schematic diagram illustrating one embodiment of a distributed computer system configured as a content delivery network (CDN)

In a known system such as that shown in FIG. 5, a distributed computer system 500 is configured as a content delivery network (CDN) and is assumed to have a set of machines 502 distributed around the Internet. Typically, most of the machines are configured as servers and located near the edge of the Internet, i.e., at or adjacent end user access networks. A network operations command center (NOCC) 504 may be used to administer and manage operations of the various machines in the system. Third party sites affiliated with content providers, such as web site 506, offload delivery of content (e.g., HTML or other markup language files, embedded page objects, streaming media, software downloads, and the like) to the distributed computer system 500 and, in particular to the servers (which are sometimes referred to as content servers, or sometimes as "edge" servers in light of the possibility that they are near an "edge" of the Internet). Such servers may be grouped together into a point of presence (POP) 507.

Typically, content providers offload their content delivery by aliasing (e.g., by a DNS CNAME) given content provider domains or sub-domains to domains that are managed by the service provider's authoritative domain name service. End user client machines 522 that desire such content may be directed to the distributed computer system to obtain that content more reliably and efficiently. The CDN servers respond to the client requests, for example by obtaining requested content from a local cache, from another CDN server, from the origin server 506, or other source.

Although not shown in detail in FIG. 5, the distributed computer system may also include other infrastructure, such as a distributed data collection system 508 that collects usage and other data from the CDN servers, aggregates that data across a region or set of regions, and passes that data to other back-end systems 510, 512, 514 and 516 to facilitate monitoring, logging, alerts, billing, management and other operational and administrative functions. Distributed network agents 518 monitor the network as well as the server loads and provide network, traffic and load data to a DNS query handling mechanism 515, which is authoritative for content domains being managed by the CDN. A distributed data transport mechanism 520 may be used to distribute control information (e.g., metadata to manage content, to facilitate load balancing, to define access control and security features, and the like) to the CDN servers.

Figure 6:
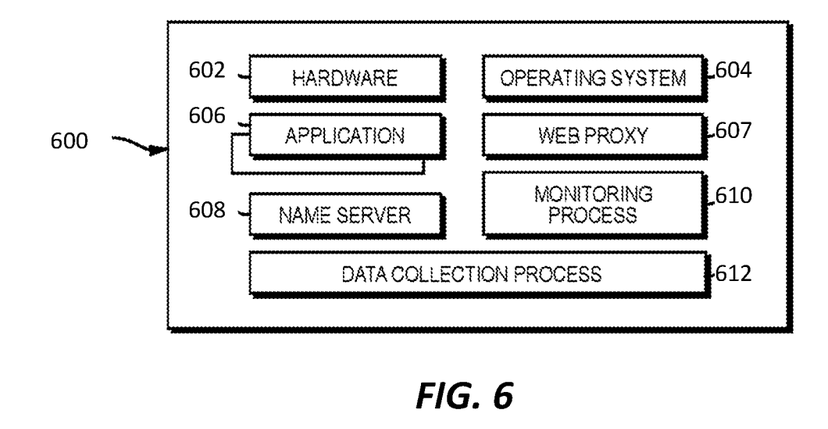
FIG. 6 is a schematic diagram illustrating one embodiment of a machine on which a CDN server in the system of FIG. 5 can be implemented.
Figure 7:
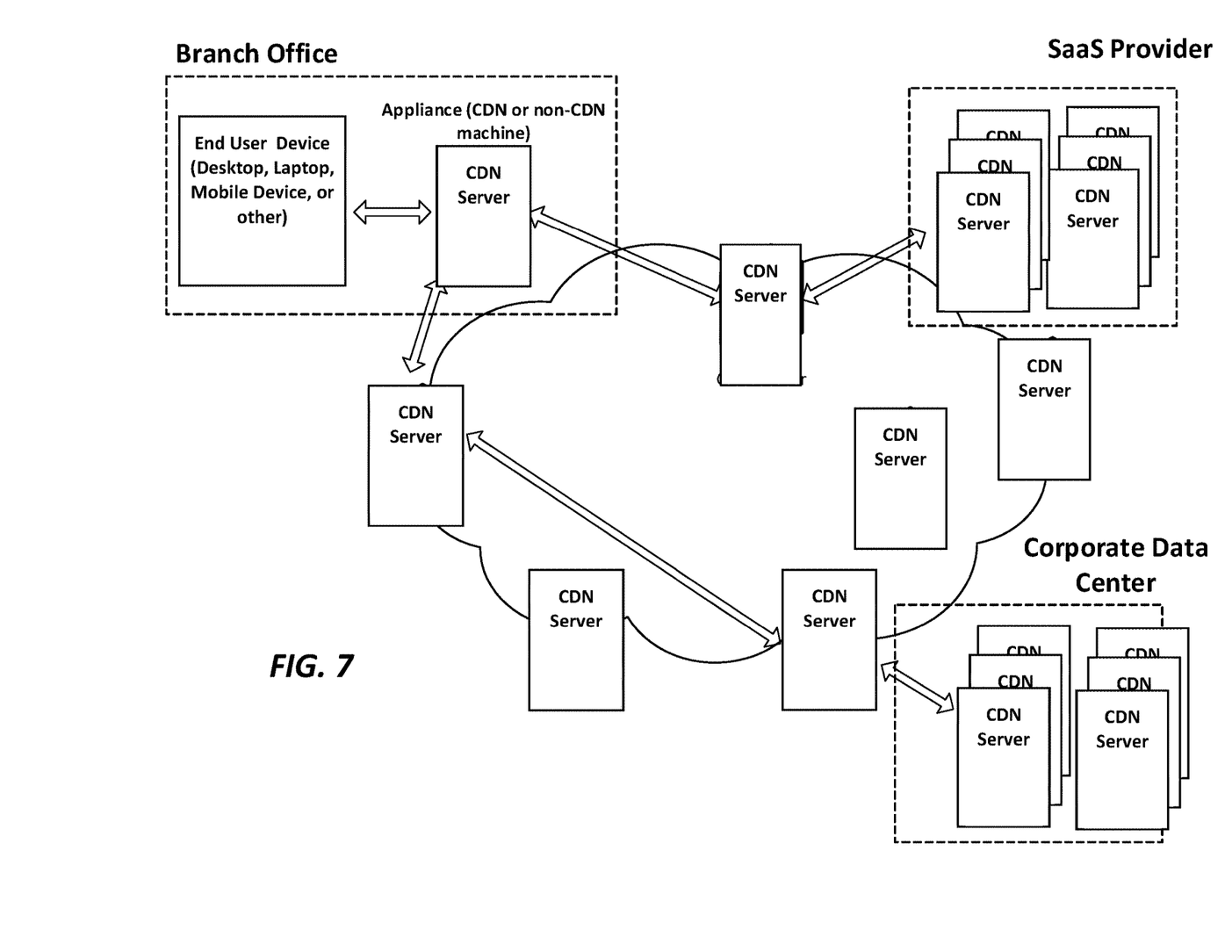
FIG. 7 illustrates a general architecture for a wide-area-network (WAN) optimized, "behind-the-firewall" service; and, FIG. 8 is a block diagram illustrating computer system hardware that may be used to implement the teachings hereof.

As illustrated in FIG. 6, a given machine 600 in the CDN comprises commodity hardware (e.g., a microprocessor) 602 running an operating system kernel (such as Linux® or variant) 604 that supports one or more applications 606a-n. To facilitate content delivery services, for example, given machines typically run a set of applications, such as an HTTP proxy 607, a name server 608, a local monitoring process 610, a distributed data collection process 612, and the like. The HTTP proxy 607 typically includes a manager process for managing a cache and delivery of content from the machine. For streaming media, the machine typically includes one or more media servers.

A given CDN server shown in FIG. 6 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end. FIG. 3 illustrates a general architecture for a WAN, optimized, "behind-the-firewall" service offerings described above.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

Any of the above-mentioned servers and/or subsystems may use the techniques disclosed in this patent application to probe and discover network paths taken by packets sent to it from other servers and/or subsystems.

Computer Based Implementation

The teachings hereof may be implemented with conventional computer systems, so long as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 8:
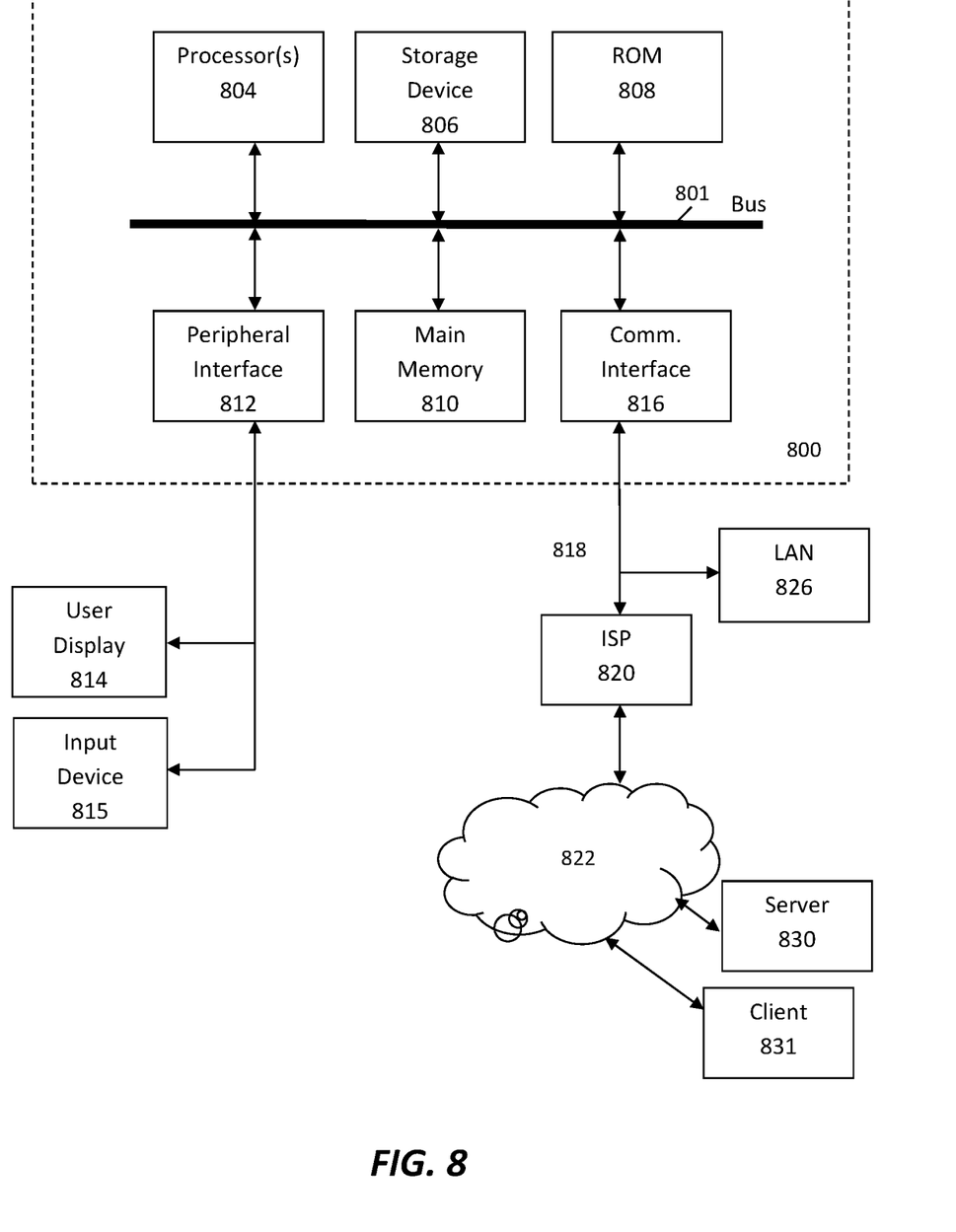

FIG. 8 is a block diagram that illustrates hardware in a computer system 800 upon which such software may run in order to implement embodiments of the invention. The computer system 800 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 800 includes a microprocessor 804 coupled to bus 801. In some systems, multiple processor and/or processor cores may be employed. Computer system 800 further includes a main memory 810, such as a random access memory (RAM) or other storage device, coupled to the bus 801 for storing information and instructions to be executed by processor 804. A read only memory (ROM) 808 is coupled to the bus 801 for storing information and instructions for processor 804. A non-volatile storage device 806, such as a magnetic disk, solid state memory (e.g., flash memory), or optical disk, is provided and coupled to bus 801 for storing information and instructions. Other application-specific integrated circuits (ASICs), field programmable gate arrays (FPGAs) or circuitry may be included in the computer system 800 to perform functions described herein.

A peripheral interface 812 communicatively couples computer system 800 to a user display 814 that displays the output of software executing on the computer system, and an input device 815 (e.g., a keyboard, mouse, trackpad, touch-screen) that communicates user input and instructions to the computer system 800. The peripheral interface 812 may include interface circuitry, control and/or level-shifting logic for local buses such as RS-485, Universal Serial Bus (USB), IEEE 1394, or other communication links.

Computer system 800 is coupled to a communication interface 817 that provides a link (e.g., at a physical layer, data link layer, or otherwise) between the system bus 801 and an external communication link. The communication interface 816 provides a network link 818. The communication interface 816 may represent a Ethernet or other network interface card (NIC), a wireless interface, modem, an optical interface, or other kind of input/output interface.

Network link 818 provides data communication through one or more networks to other devices. Such devices include other computer systems that are part of a local area network (LAN) 826. Furthermore, the network link 818 provides a link, via an internet service provider (ISP) 820, to the Internet 822. In turn, the Internet 822 may provide a link to other computing systems such as a remote server 830 and/or a remote client 831. Network link 818 and such networks may transmit data using packet-switched, circuit-switched, or other data-transmission approaches.

In operation, the computer system 800 may implement the functionality described herein as a result of the processor executing code. Such code may be read from or stored on a non-transitory computer-readable medium, such as memory 810, ROM 808, or storage device 806. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 818 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method to determine a network path taken by packets sent from a second network node to a first network node without having control of the second network node, the method comprising:
    sending a first IP packet from a first network node to a second network node, the second network node being remote from the first network node;
    the first IP packet comprising: an outer packet and an inner packet, the inner packet comprising a second IP packet having:
        an inner time to live (TTL) value, an inner destination IP address pointing to the first network node, and an inner source IP address;
    the first network node setting the inner TTL value to be less than the number of hops between the second and first network nodes; and,
    receiving an error message directed to the inner source IP address, the error message received from an intermediate network node that is on a network path between the second and first network nodes, the error message indicating that the inner TTL value expired at the intermediate network node as the inner packet traveled on the network path from the second network node towards the first network node after being reflected from the second network node.

2. The method of claim 1, wherein the first and second IP packets are sent using a tunneling protocol.

3. The method of claim 1, wherein the first network node is a server operated by a service provider and the second network node is a server operated by a customer of the service provider.

4. The method of claim 1, wherein the first network node is a content delivery network (CDN) server operated by a CDN service provider and the second network node is an origin server operated by content provider.

5. The method of claim 1, wherein the intermediate network node comprises a router.

6. A non-transitory computer readable medium storing instructions for execution on one or more hardware processors, the instructions comprising computer program instructions for:
    sending a first IP packet from a first network node to a second network node, the second network node being remote from the first network node;
    the first IP packet comprising: an outer packet and an inner packet, the inner packet comprising a second IP packet having:
        an inner time to live (TTL) value, an inner destination IP address pointing to the first network node, and an inner source IP address;
    the first network node setting the inner TTL value to be less than the number of hops between the second and first network nodes; and,
    receiving an error message directed to the inner source IP address, the error message received from an intermediate network node that is on a network path between the second and first network nodes, the error message indicating that the inner TTL value expired at the intermediate network node as the inner packet traveled on the network path from the second network node towards the first network node after being reflected from the second network node.

7. The non-transitory computer readable medium of claim 6, wherein the first and second IP packets are sent using a tunneling protocol.

8. The non-transitory computer readable medium of claim 6, wherein the first network node is a server operated by a service provider and the second network node is a server operated by a customer of the service provider.

9. The non-transitory computer readable medium of claim 6, wherein the first network node is a content delivery network (CDN) server operated by a CDN service provider and the second network node is an origin server operated by content provider.

10. The non-transitory computer readable medium of claim 6, wherein the intermediate network node comprises a router.

* * * * *